US009340171B2

(12) United States Patent
Heberling et al.

(10) Patent No.: US 9,340,171 B2
(45) Date of Patent: May 17, 2016

(54) DEFORMATION ELEMENT, IN PARTICULAR FOR BUMPERS ON MOTOR VEHICLES

(71) Applicant: VOLKSWAGEN AKTIENGESELLSCHAFT, Wolfsburg (DE)

(72) Inventors: Patrick Heberling, Calvörde (DE); Matthias Krüger, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 14/375,252

(22) PCT Filed: Jan. 29, 2013

(86) PCT No.: PCT/EP2013/051625
§ 371 (c)(1),
(2) Date: Jul. 29, 2014

(87) PCT Pub. No.: WO2013/113672
PCT Pub. Date: Aug. 8, 2013

(65) Prior Publication Data
US 2015/0021941 A1 Jan. 22, 2015

(30) Foreign Application Priority Data
Feb. 1, 2012 (DE) .......................... 10 2012 001 940

(51) Int. Cl.
*B60R 19/02* (2006.01)
*B60R 19/03* (2006.01)
*B60R 19/34* (2006.01)

(52) U.S. Cl.
CPC ................. *B60R 19/03* (2013.01); *B60R 19/34* (2013.01)

(58) Field of Classification Search
CPC .................... B60R 19/34; B60R 19/18; B60R 2021/01095; B60R 21/0136; C08F 220/36; B32B 5/26; B32B 27/12; D04H 13/007; D04H 3/04; Y10T 428/24124
See application file for complete search history.

(56) References Cited

U.S. PATENT DOCUMENTS 5,200,261 A * 4/1993 Taguchi et al. ............... 442/200
5,597,629 A * 1/1997 Johnson ....................... 428/36.1
(Continued)

FOREIGN PATENT DOCUMENTS

DE 42 40 237 A1 6/1994
DE 10 2010 022 998 A1 12/2010
(Continued)

OTHER PUBLICATIONS

German Search Report for German Patent Application No. DE 10 2012 001 940.8, mailed Oct. 25, 2012.
International Search Report for International Patent Application No. PCT/EP2013/051625, mailed Apr. 22, 2013.

*Primary Examiner* — Kiran B Patel
(74) *Attorney, Agent, or Firm* — Pearl Cohen Zedek Latzer Baratz LLP (57) ABSTRACT

The invention relates to a deformation element, in particular for bumper cross member (2) on a motor vehicle, having at least one predetermined breaking point (S) at which, in the event of a crash, the deformation element (1) breaks apart into a breaking segment (1a) facing the crash which is displaced over the course of the crash and into a stationary breaking segment (1b) facing away from the crash. According to the invention the deformation element (1) is produced with at least one material layer (4) made of a fibre-reinforced plastic having a fibre fabric (14) embedded in a bedding material (10), said fibre fabric being exposed, after the deformation element (1) breaks apart, between the breaking segments (1a, 1b) and connecting said breaking segments to each other.

9 Claims, 10 Drawing Sheets

(56) References Cited

U.S. PATENT DOCUMENTS

| | | | |
|---|---|---|---|
| 5,669,214 A * | 9/1997 | Kopanakis | 57/218 |
| 6,065,963 A * | 5/2000 | Dewaegheneire et al. | 431/329 |
| 6,152,840 A * | 11/2000 | Baum | 473/564 |
| 6,260,692 B1 * | 7/2001 | Sashide et al. | 198/847 |
| 7,422,714 B1 * | 9/2008 | Hood et al. | 264/219 |
| 2006/0028038 A1 * | 2/2006 | Glasgow et al. | 293/132 |
| 2006/0125291 A1 * | 6/2006 | Buravalla et al. | 296/204 |
| 2007/0284895 A1 * | 12/2007 | Toneatti et al. | 293/120 |
| 2011/0053448 A1 * | 3/2011 | Hobl et al. | 442/181 |
| 2012/0034833 A1 * | 2/2012 | Schaube et al. | 442/172 |

FOREIGN PATENT DOCUMENTS

| | | |
|---|---|---|
| DE | 20 2009 017 016 U1 | 5/2011 |
| EP | 2335983 | 6/2011 |
| FR | 2 835 792 A1 | 8/2003 |
| JP | 2005 047387 A | 2/2005 |
| WO | WO 2011/058152 A1 | 5/2011 |
| WO | WO 2011/073315 A1 | 6/2011 |

* cited by examiner

FIG. 12
Section I-I

FIG. 13
Section II-II

DEFORMATION ELEMENT, IN PARTICULAR FOR BUMPERS ON MOTOR VEHICLES

CROSS-REFERENCE TO RELATED APPLICATIONS

This application is a National Phase Application of PCT International Application No. PCT/EP2013/051625, International Filing Date Jan. 29, 2013, claiming priority of German Patent Application No. DE 10 2012 001 940.8, filed Feb. 1, 2012, which are hereby incorporated by reference.

FIELD OF THE INVENTION

The present invention relates to a deformation element, in particular for bumpers on motor vehicles.

BACKGROUND OF THE INVENTION

Numerous proposals for designing such deformation elements are known, which are situated, in particular, between main chassis beams of a vehicle body and a bumper cross member, and are intended specifically to reduce impact energy during a vehicle crash. Such tubular deformation elements, made mostly of sheet steel, are designed in such a way that a reduction in energy may take place as a result of selective weak points, such as undulations, indentations, abrupt changes in diameter in which the tube sections are subsequently pushed one on top of the other, etc. Hence, as the deformation energy is reduced, a deformation of the deformation elements occurs.

As an alternative, the deformation energy may be reduced not as a result of deformation but rather as a result of the deformation element breaking apart. For this purpose, the deformation element may be provided with predetermined breaking points at which no material deformation takes place, but rather the deformation element breaks apart into separate breaking segments as the deformation energy is reduced. Of these, for example, one breaking segment facing the crash may be displaced over the further course of the crash, while one breaking segment facing away from the crash remains fixed to the vehicle body.

SUMMARY OF THE INVENTION

The object of the present invention is to provide a deformation element of the generic kind which, while lower in weight, makes a comparable or improved reduction of energy possible.

The object of the present invention is achieved with the features of described herein. Advantages and particularly useful refinements of the present invention are the subject matter further description herein.

The present invention relates to a deformation element, which includes at least one predetermined breaking point at which, in the event of a crash, the deformation element breaks apart into at least one breaking segment facing the crash, which is displaced over the course of the crash, and one fixed breaking segment facing away from the crash. The present invention is based on the fact that it is very difficult to achieve a sufficient reduction in crash-related deformation energy merely by the breaking apart of the deformation element. Against this background, the deformation element according to some embodiments described herein is produced with at least one material layer made of a fiber-reinforced plastic having a fiber fabric embedded in a bedding material (matrix). After the deformation element has broken apart, the fiber fabric is exposed in sections between the breaking segments. Thus, the breaking segments continue to remain loosely connected to one another. The result, therefore, is a deformation element with a novel operating principle, in which the fiber fabric is torn from the bedding material (matrix) when impact forces occur, and impact energy is specifically reduced as a result.

Once the deformation element has broken apart, the breaking segment facing the crash may be displaced past the fixed breaking segment facing away from the crash and, as deformation energy is further reduced, additional fiber fabric material may be torn from the bedding material.

The section of the fiber fabric exposed between the breaking segments is tensioned during the course of the crash. The exposed fiber fabric section is designed with a high tensile strength so that it does not tear apart. To increase the tensile strength, the fibers of the fiber fabric may be aligned in the direction of tension. The section of the fiber fabric exposed between the breaking segments may be largely without form stability and limp, but with high tensile strength, as compared to the fiber-plastic-composite of the deformation element. In contrast, the bedding material, as compared to the fiber fabric, is brittle.

In another specific embodiment, the material layer of the deformation element, together with outer material layers on both sides, may form a three-layer structure. The outer material layers may also be made of a fiber-reinforced plastic. The fiber fabric of the middle material layer may be preferably designed with a high fiber strength, as compared to the outer material layers. In addition, the fibers of the middle material layer may be aligned essentially in the longitudinal direction and the fibers of the outer fiber layers may be aligned in a direction perpendicular and/or inclined thereto.

The fibers of the middle material layer may be formed from carbon fibers, Kevlar fibers, aramid fibers, boron fibers or the like. In contrast, the fibers of the outer layers may be formed from glass fibers. The bedding material [of] the fiber fabric of the material layers may be an epoxy resin, a polyester resin and/or a vinyl ester resin.

In one particular specific embodiment, the deformation element may have a tubular or a polygonal profile part. The predetermined breaking point may preferably be an abrupt change in diameter, at which the breaking segments merge in such a way that in the event of a crash-related force transmission, the breaking segments are pushed one on top of the other.

It has also proven particularly advantageous if the middle layer of fibers is aligned essentially in the longitudinal direction (in the main direction of force transmission), and the outer fiber layers are aligned in a direction perpendicular and/or inclined thereto. As a result, the fibers which are rigid in the direction of tension are only selectively turned without the deformation element breaking apart.

In one preferred embodiment of the deformation element, the material strength of the middle layer may be equal to or greater than that of the respective outer layer in order to thereby selectively adjust the deformation behavior. In this case, the strength-related fiber content of the outer layers may also be equal to or less than the fiber content of the middle layer.

In another preferred embodiment of the deformation element, the total fiber content in the matrix may lie between 37% and 67%, the fiber content of the outer layers between 17% and 72% and the fiber content of the middle layer between 23% and 63%, in order to produce the required strength properties. In addition, the fiber diameters of the fibers may be configured to be between 5 μm and 17 μm.

Additional, structurally advantageous concepts of the deformation element may be integrated weak points, undulations, indentations, etc., as recited in the subclaims below.

Normally, the cross members of a bumper assembly are formed from a metal sheet made of aluminum or steel, as a result of which the overall weight of the bumper assembly is correspondingly high. Against this background, it is advantageous in terms of reducing weight to implement the cross member as a plastic component. The cross member may preferably have the same basic layered structure as the deformation element described above. Reference may therefore be made to the description of the layered structure of the deformation element. In particular, the cross member may include at least one material layer made of a fiber-reinforced plastic having a fiber fabric embedded in a bedding material. To increase the tensile strength of the cross member, the fiber fabric may be configured in the vehicle transverse direction. Similarly, the fibers of the fiber fabric may be aligned in the vehicle transverse direction.

The above mentioned fiber-reinforced plastic having the fiber fabric embedded in the bedding material may form the base part of the cross member. For additional form stabilization, it is possible to cover this cross member base part with an outer material layer. The outer material layer may also be made of a fiber-reinforced plastic, the strength of which is reduced, as compared to the fiber-reinforced plastic of the inner cross member base part.

The cross member in the form of a plastic component may have an arbitrary profile shape, for example as a rectangular profile made of solid material, as a closed hollow profile or as a c-shaped hollow profile open in the vehicle longitudinal direction.

In one embodiment as a plastic component, the cross member may be produced together with the two lateral deformation elements, preferably in one combined working step. In this way, the cross member, together with the deformation elements, may form a materially uniform and/or integrated unit.

In the event of a frontal collision of the vehicle, a smooth force transmission from the cross member into the two lateral deformation elements is very important in order to ensure the deformation of the deformation elements mentioned above for reducing the crash energy. Against this background, it is possible according to one specific embodiment to position the cross member in front of the deformation element in the vehicle longitudinal direction, i.e., the front end face of the deformation element is covered by the cross member.

The problem was recognized that in the event of a collision, the lateral joints, in particular at which the deformation elements are connected to the cross member, form weak points during force transfer.

Against this background, a configuration of the joints which meets crash requirements is of particular relevance. For example, it is possible to extend the fiber fabric of the deformation element with at least one fabric strip forward beyond the end face of the deformation element in the vehicle longitudinal direction. The forwardly extended fabric strip may be an integral component of the plastic cross member, i.e., in particular, may be embedded in the plastic material of the cross member. The fabric strip of the deformation element embedded in the plastic material of the cross member ensures a material cohesion between the cross member and the deformation element in the event of a crash.

For example, the fiber fabric of the deformation element may be extended forward with one upper and one lower horizontal fabric strip, between which the cross member is situated. The upper and lower fabric strips may enclose the aforementioned cross member base part and may preferably be designed as a closed loop, which loops around the cross member base part. In this case, the loop defines a retaining pocket into which the end of the cross member base part is inserted. An outer material layer of the cross member may then be laminated over the joint thus formed.

In addition, the fiber fabric of the deformation element may be forwardly extended in the vehicle transverse direction with a laterally interior and/or laterally exterior vertical fabric strip. The cross member (or its base part) may be situated between the two vertical fabric strips.

The fabric strips of the two deformation elements extended forwardly in the longitudinal direction of the vehicle may be connected to one another while forming a shared lateral strip extending in the vehicle transverse direction. In this case, the fiber fabric extends continuously from the one deformation element past the joint along the cross member to the other deformation element on the opposite side of the vehicle.

The fiber direction of the fiber fabric or of the fabric strip is adjusted in the load direction, as a result of which a favorable loading with respect to the material (fiber composite and matrix) as well as a homogenous force transmission into the vehicle structure may take place. In the event of a frontal collision, the unidirectional fibers of the cross member are stressed and transmit the crash energy to the bi-directional ply structures of the outer material layer.

In another specific embodiment, the deformation element may be positioned outwardly in front of the cross member in the vehicle transverse direction, i.e., the deformation element covers the end face of the cross member or the end face of the cross member base part. In this case, the fiber fabric of the cross member may be extended laterally outward with at least one fabric strip beyond the cross member end face in the vehicle transverse direction. The laterally extended fabric strip may be an integral component of the deformation element. The fabric strip extended laterally outward in the vehicle transverse direction may be an integral component of the plastic cross member, i.e., in particular, embedded in the plastic material of the cross member. The fabric strip of the deformation element embedded in the plastic material of the cross member ensures a material cohesion between the cross member and the deformation element in the event of a crash. For example, the fiber fabric of the deformation element may be extended laterally outward with an upper and a lower horizontal fabric strip, between which the deformation element is situated. The upper and lower fabric strips may enclose the deformation element and may preferably be designed as a closed loop, which loops around the deformation element. In this case, the loop defines a retaining pocket into which the end of the deformation element is inserted. An outer material layer may then be laminated over the joint thus formed.

In addition, the fiber fabric of the cross member may also be extended laterally outward in the vehicle longitudinal direction with a front vertical fabric strip. The front vertical fabric strip covers the front end face of the deformation element.

The advantageous embodiments and/or refinements of the present invention explained above and/or reproduced in the subclaims may—except, for example, in those cases of clear dependencies or incompatible alternatives—be used individually or else with one another in arbitrary combination.

BRIEF DESCRIPTION OF THE DRAWINGS

The present invention and its advantageous embodiments and refinements and their advantages are explained in greater detail below with reference to the drawings.

DETAILED DESCRIPTION OF THE INVENTION

Figure 1:
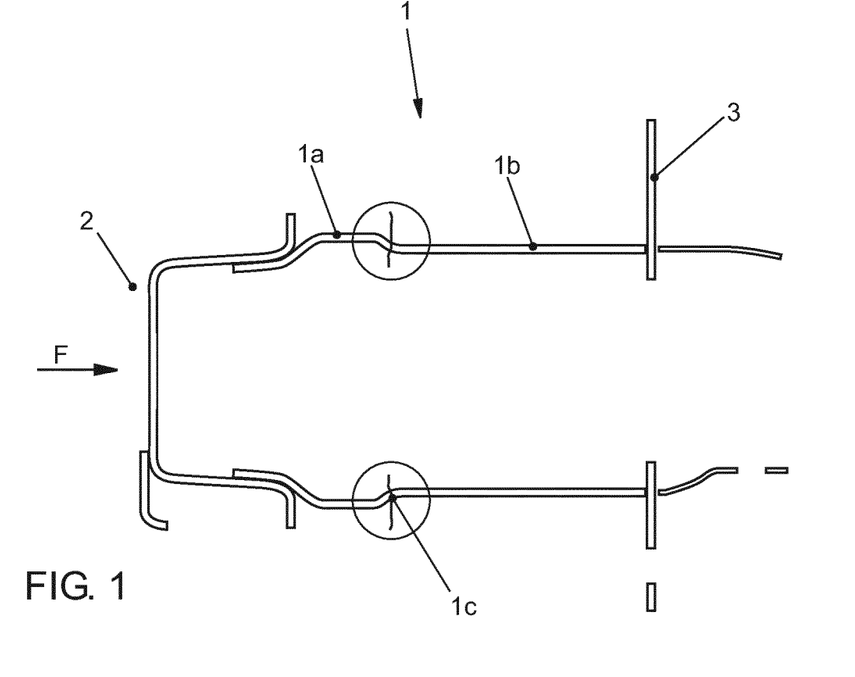
FIG. 1 shows a longitudinal section of a tube-shaped deformation element made of fiber-reinforced plastic, having an abrupt diameter change as a predetermined breaking point for initiating a targeted push over operation in the event of a vehicle crash.

FIG. 1 shows a tube-shaped deformation element 1 made of fiber-reinforced plastic having a, for example, circular, oval or rounded polygonal cross section, which may be situated at the front end or rear end of a passenger vehicle, and which is attached or affixed on the one hand to a bumper cross-member 2 and on the other hand to a flange plate 3 of a main chassis beam, not further depicted. At least two deformation elements 1 are provided in a known manner on both sides of the motor vehicle.

Deformation element 1 includes a tube section 1a of somewhat smaller wall thickness attached to cross member 2 and a tube section 1b of greater wall thickness attached to flange plate 3, which merge at a predetermined breaking point S, forming an abrupt diameter change. Two tube sections 1a, 1b form predefined breaking segments, which break apart at predetermined breaking point S in the case of the crash described below. Tube sections 1a, 1b are referred to as breaking segments hereinafter and also in the description of deformation element 1 not yet broken apart as a result of an accident.

Figure 2:
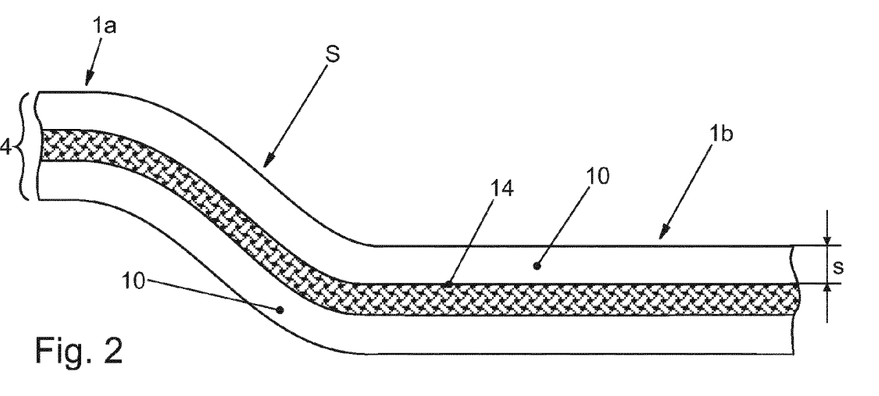
FIG. 2 shows an enlarged sectional view of the material structure of the deformation element in the area of the predetermined breaking point.

FIG. 2 shows an enlarged sectional view of deformation element 1 in the area of predetermined breaking point S. From this, the basic material structure of the deformation element is apparent. Accordingly, a material layer 4 made of a fiber-reinforced plastic is provided, in which a fiber fabric 14 is embedded in a bedding material 10 or a matrix. Bedding material 10 covers the fiber fabric 14 on both sides, each with a layer thickness s.

The deformation behavior of deformation element 1 in the event of a frontal collision is described with reference to the additional FIGS. 3 and 4, in which a motor vehicle collides with an obstacle or an external impact (for example, a rear-end collision) occurs. During the impact of the motor vehicle, which is oriented in the direction of force F, deformation element 1 breaks apart at predetermined breaking point S. This results in the formation of breaking segments 1a, 1b according to FIGS. 3 and 4. Of these, breaking segment 1a facing the crash is displaced to the rear during the course of the crash, whereas breaking segment 1b facing away from the crash remains fixed to the vehicle body. Starting from predetermined breaking point S, breaking segment 1a facing the crash is pushed past stiffer, fixed breaking segment 1b of a defined length in one impact energy-reducing push-over process, as a result of which greater structural damage to the motor vehicle is initially prevented.

Figure 3:
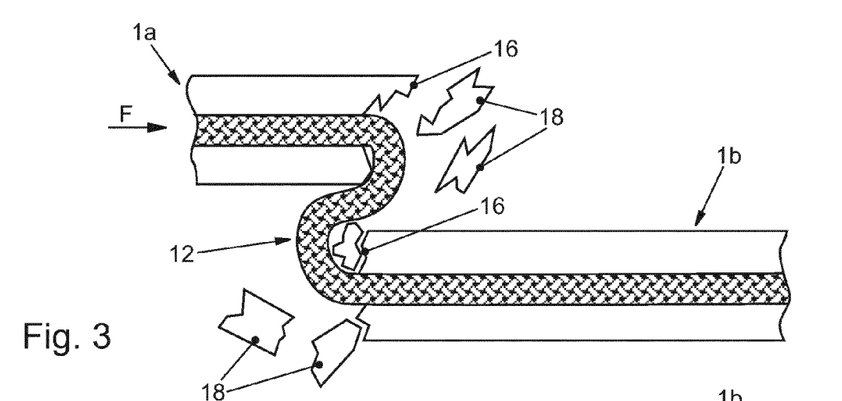
FIGS. 3 and 4 each show views corresponding to FIG. 2, which illustrate the tearing out of the fiber fabric in the event of a crash.
Figure 4:
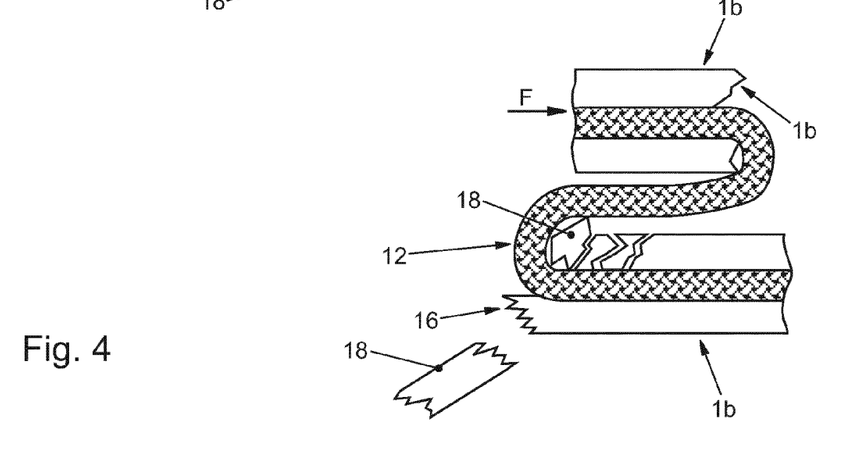

According to FIGS. 3 and 4, breaking segments 1a, 1b have breaking edges 16 facing one another. Breaking segments 1a, 1b are loosely connected to one another at their breaking edges 16 via an exposed section 12 of fiber fabric 14. In the push-over process depicted in FIGS. 3 and 4, breaking segment 1a facing the crash is displaced past breaking segment 1b facing away from the crash. Thus, breaking edge 16 of breaking segment 1a facing the crash moves to the left in the direction of force F in FIGS. 3 and 4. As a result, new breaking material 18 is continuously broken off from bedding material 10 as the deformation energy is reduced. Thus, the length of exposed section 12 of fiber fabric 14 increases during the course of the crash.

Section 12 of fiber fabric 14 exposed between breaking segments 1a, 1b is no longer firmly integrated into bedding material 10 and therefore largely lacks form stability as compared to the fiber-plastic composite of deformation element 1, i.e., it is limp. In the event of a crash, fiber fabric 14 is tensioned in exposed section 12. To prevent it from tearing apart, fiber fabric 14 has an increased fiber strength in the direction of tension. The fibers of fiber fabric 14 are aligned in the direction of tension in order to increase the tensile strength.

Figure 5:
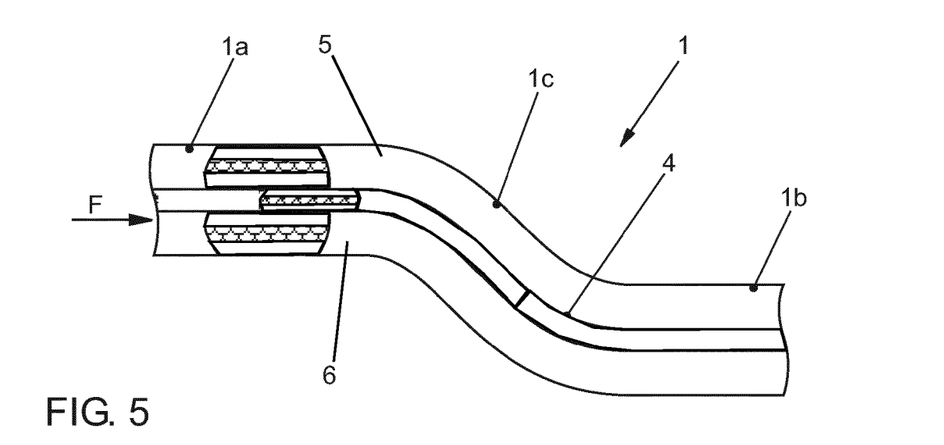
FIG. 5 shows in a view corresponding to FIG. 2 another exemplary embodiment of a material structure of the deformation element.

FIG. 5 shows an alternative material structure of deformation element 1, in which material layer 4, together with outer material layers 5, 6 on both sides thereof, form a three-layer structure. Outer material layers 5, 6 are also produced from a fiber-reinforced plastic. The fiber fabrics of the three material layers may each be integrated into an embedding, shared matrix (no reference numeral) made of epoxy resin.

Figure 6:
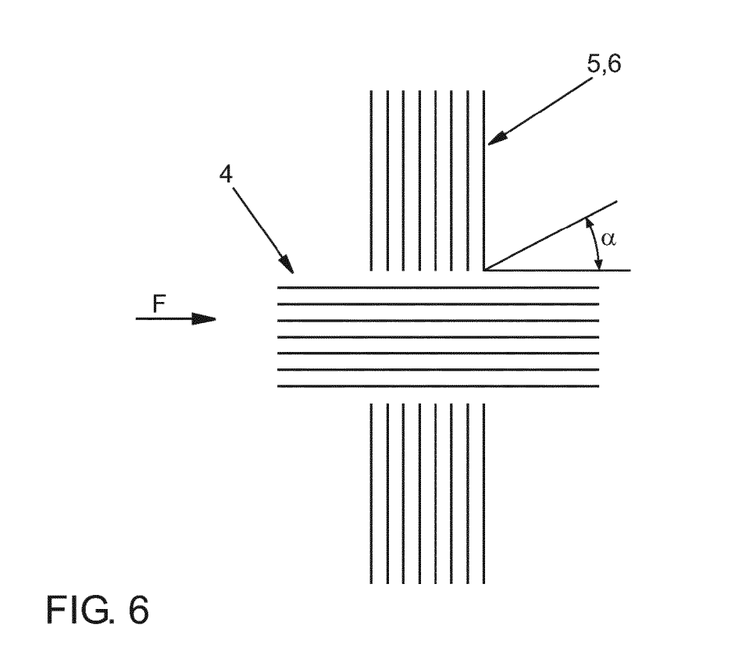
FIG. 6 shows a simplified representation of the alignment of the inner and the outer fiber layers of the deformation element depicted in FIG. 5.

The fiber fabric of the middle material layer 4 is made, for example, of high-strength carbon fibers, which are aligned in longitudinal direction F (primary direction of force in a front-end or rear-end collision) of deformation element 1, as illustrated in FIG. 6. The high-strength fibers may also be formed of Kevlar fibers, aramid fibers, boron fibers, etc.

In contrast, the less tensile resistant fibers of material layers 5 and 6, for example, are formed of glass fibers and situated perpendicularly to the inner material layers 4 and/or at an angle α thereto.

Each of material layers 4, 5, 6 may be impregnated and enclosed by a matrix made of epoxy resin and processed by appropriate curing to form a deformation element 1. In the process, the one material layer 4 exhibiting a high tensile strength may contain transverse fibers reinforcing in the circumferential direction.

In the preferred embodiment of deformation element 1 (FIG. 5), the material strength of middle layer 4 may be equal to or greater than each of outer layers 5, 6, in order therefore to selectively adjust the deformation behavior. In addition, the strengthening fiber content of outer layers 5, 6 may be equal to or less than the fiber content of middle layer 4.

Furthermore, in order to produce the required strength properties, the total fiber content in the matrix of deformation element 1 may lie between 37% to 67%, the fiber content of outer layers 5, 6 between 17% and 72% and the fiber content of middle layer 4 between 23% and 63%. In addition, the diameters of the fibers used measure preferably between 5 µm and 17 µm.

Figure 7:
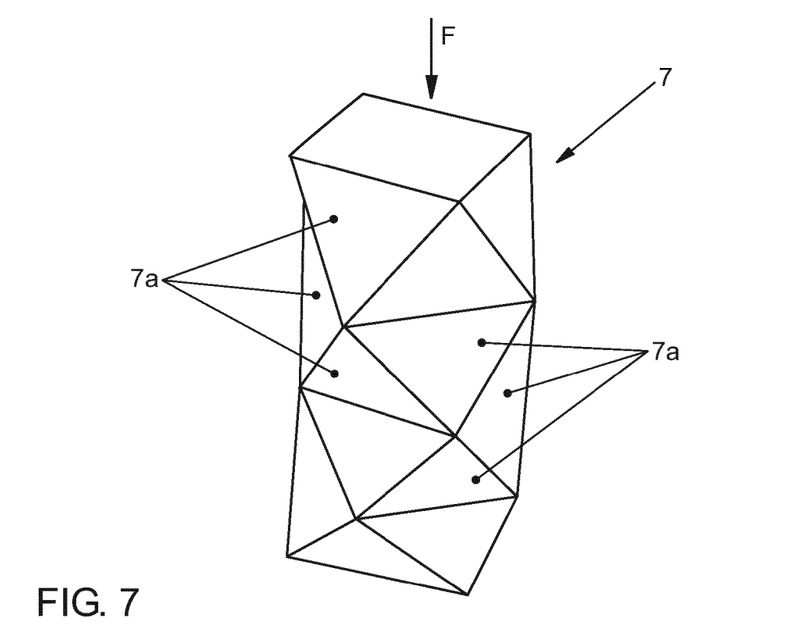
FIG. 7 shows a three-dimensional view of an alternative deformation element having circumferentially distributed indentations.

FIG. 7 shows a sketch of an alternative design of an implemented deformation element 7 as described above, which is also produced essentially in the form of a tube (for example, with a rectangular cross section), and the wall design which includes fiber layers 4, 5, 6, includes impact energy-reducing weak points in the form of triangular-shaped or v-shaped indentations 7a, which, as is apparent, are distributed circumferentially and situated one behind the other.

Figure 8:
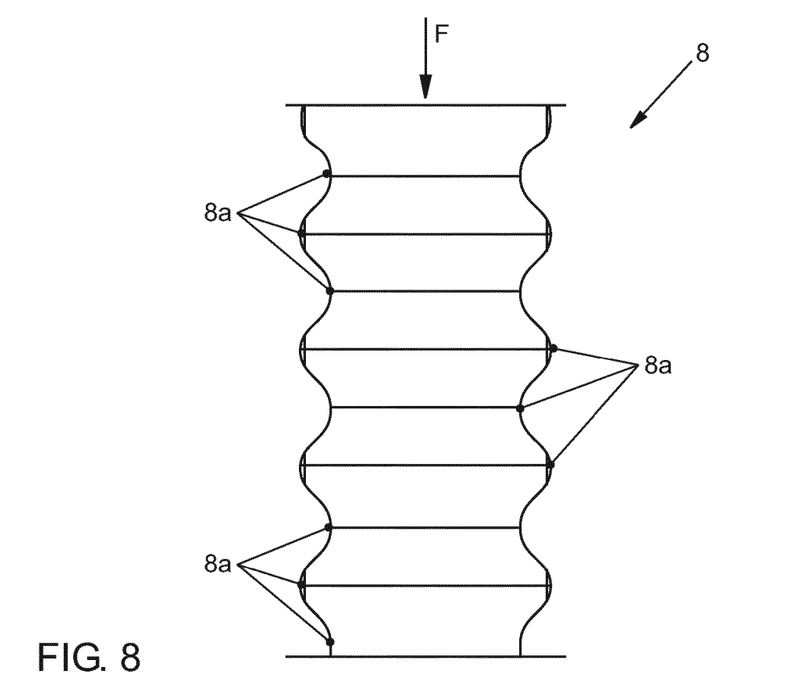
FIG. 8 shows another alternatively designed deformation element having undulations for deformation according to the folding principle when impact forces occur.

A further alternative deformation element 8 is indicated in FIG. 8, which is tubular in design and in which impact energy-reducing weak points in the form of undulations 8a extending in the circumferential direction are impressed.

Moreover, deformation elements 7 (FIG. 7) and 8 (FIG. 8), as described above with respect to deformation element 1, are made of fiber-reinforced plastic and have a middle high-strength fiber layer 4 and inner and outer fiber layers 5, 6 made of glass fibers and a matrix surrounding the former made of epoxy resin, polyester resin and/or vinyl ester resin.

During a crash of a motor vehicle in impact direction F, deformation elements 1, 7, 8 are correspondingly deformed via weak points 1c, 7a, 8a, the high-strength fibers of middle fiber layer 4 being correspondingly deformed and, in the process, "tearing out" the weaker glass fibers of inner and outer fiber layers 5, 6 from the shared matrix, thereby effectively reducing the impact energy. Due to the high-strength middle fiber layer 4, however, the structural connection between bumper cross member 2 and flange section 3 of the main chassis beam on the body side remains intact.

Figure 9:
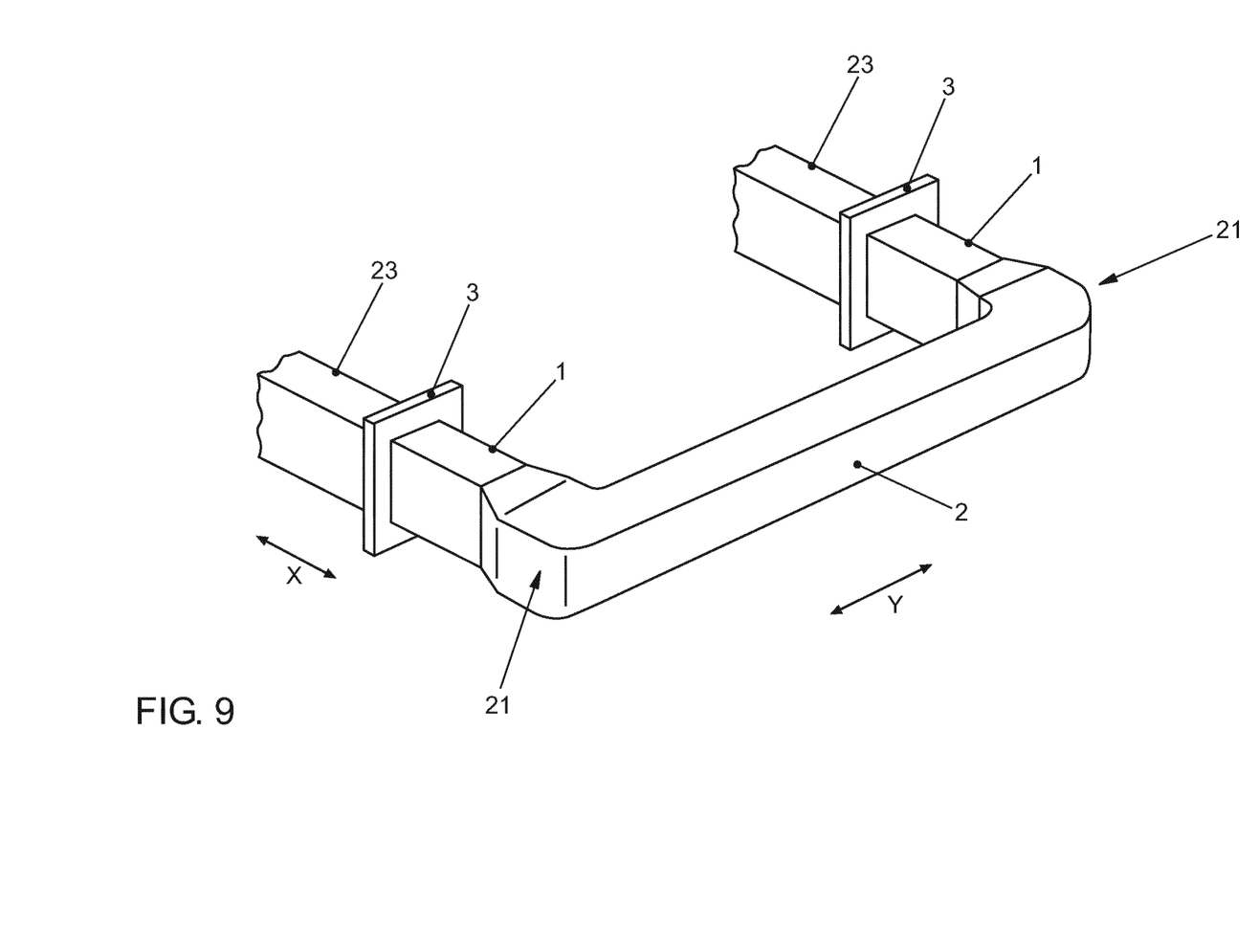
FIG. 9 shows a perspective schematic diagram of a bumper assembly.

FIG. 9 depicts a bumper assembly of a motor vehicle, in which cross member 2 merges with two outer deformation elements 1 via joints 21 described in detail below. Deformation elements 1 may be identical to deformation elements 1 depicted in FIGS. 1 through 8 in terms of the layered structure and functionality. Both deformation elements 1 shown in FIG. 9 are each attached to flange plates 3, to which vehicle main chassis beams 23 are connected.

Figure 10:
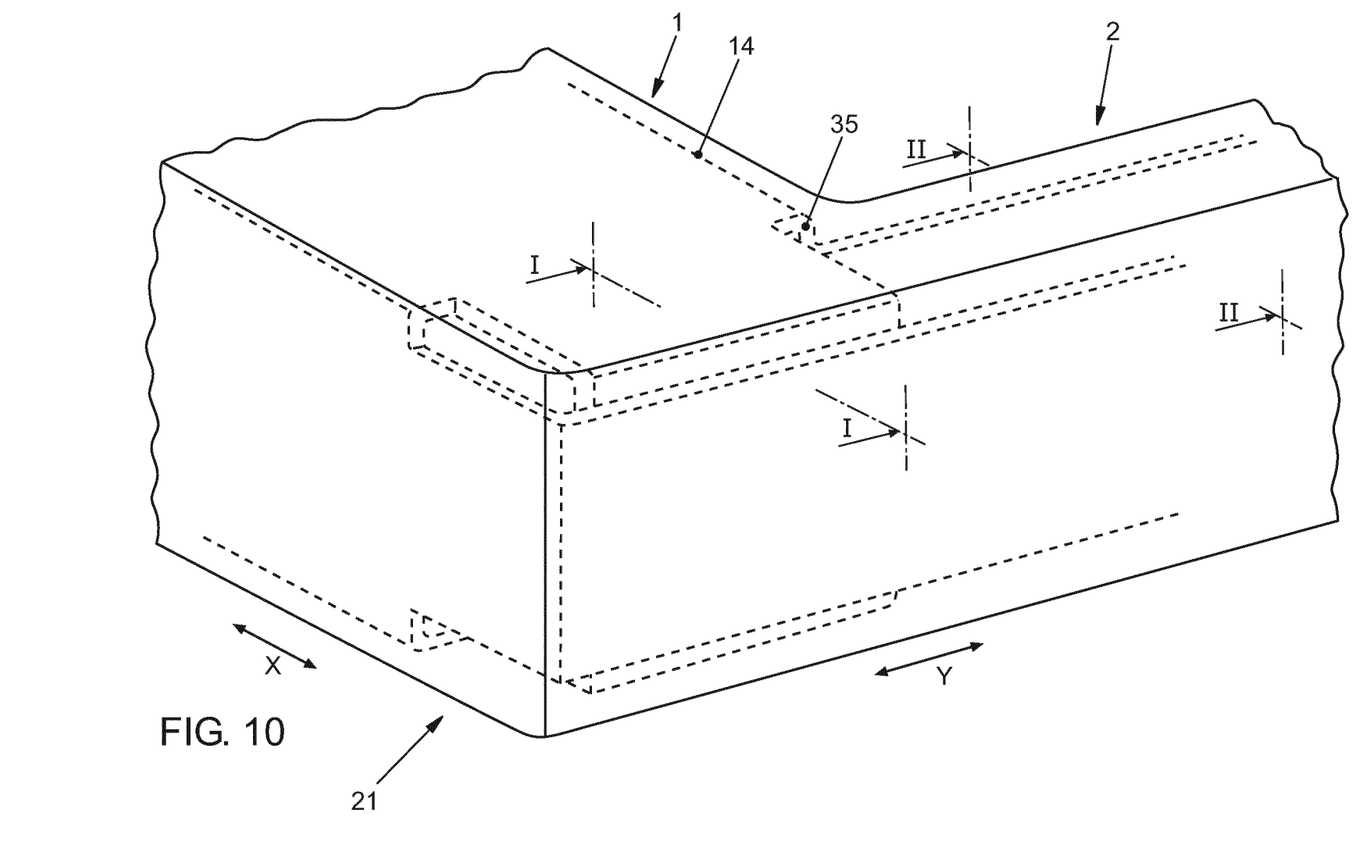
FIGS. 10 through 13 show different views of a joint between the deformation element and the cross member according to one first exemplary embodiment.
Figure 11:
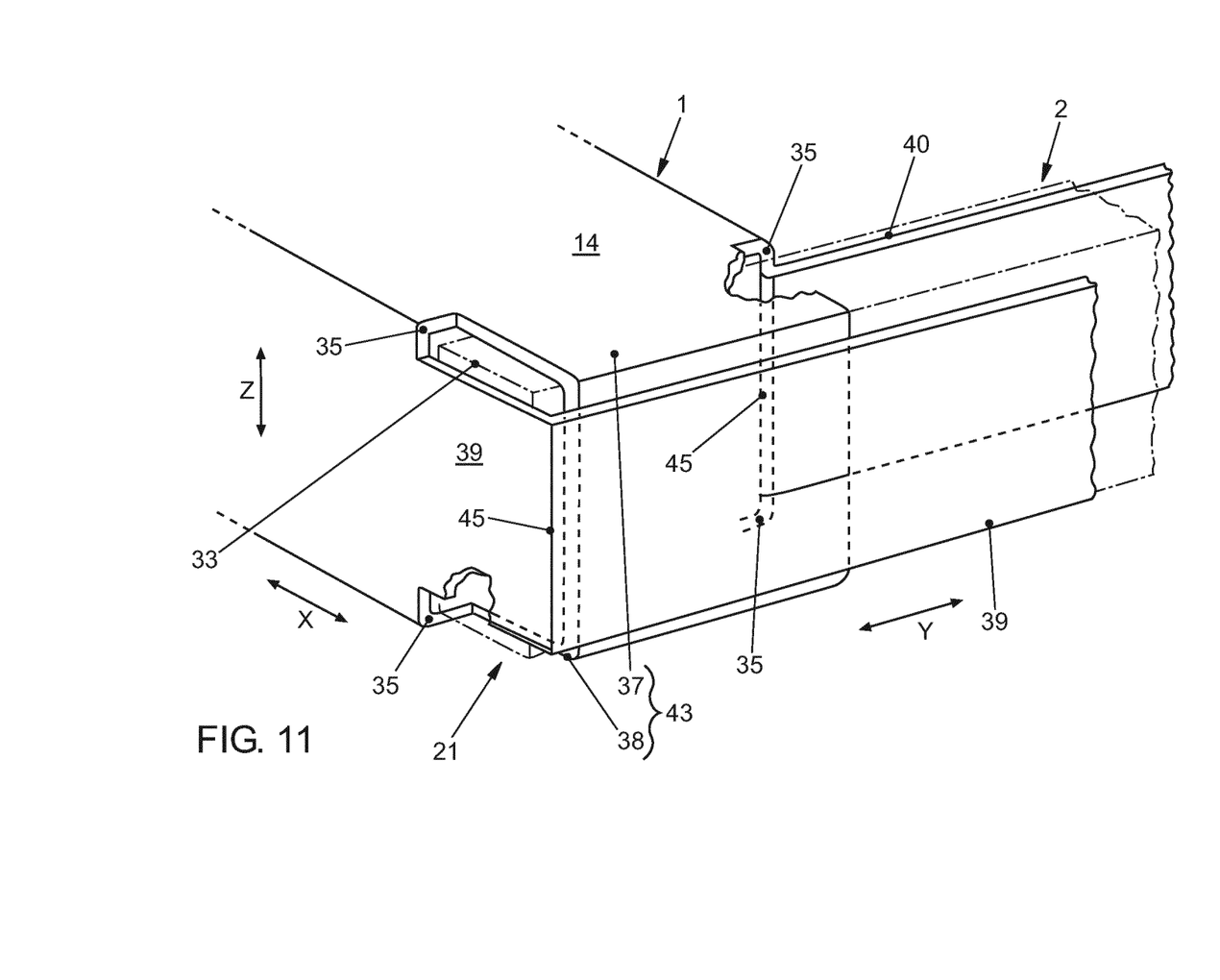
Figure 12:
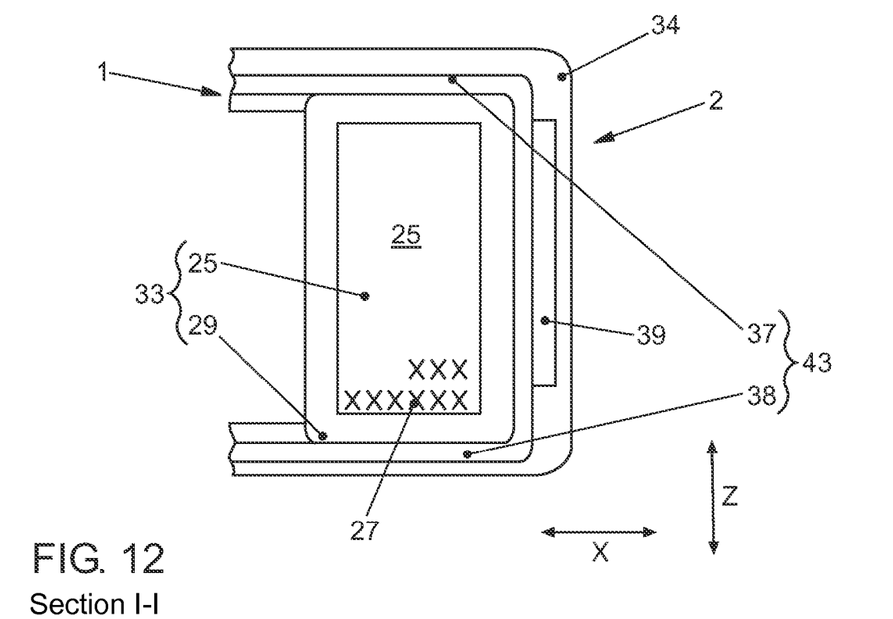
Figure 13:
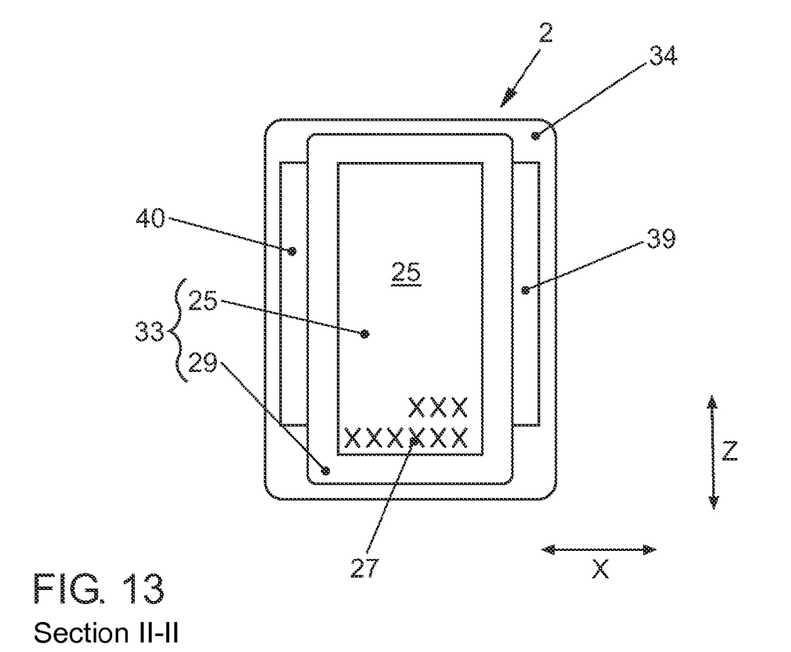

Cross member 2 in the following FIGS. 9 through 15 is not implemented as a sheet metal part, but rather as a plastic component, the layered structure of which is shown in FIG. 12 or 13. Accordingly, cross member 2 includes an inner material layer 25 [made] of a fiber-reinforced plastic, in which a fiber fabric 27 (partially indicated by cross-hatching in FIGS. 11 and 12) is embedded in a bedding material or a matrix material. Inner material layer 25 is covered by an outer material layer 29. This outer layer may also be made of a fiber-reinforced plastic, the fibers of which are bi-directionally aligned. In contrast, the fibers of fiber fabric 27 of inner material layer 25 are unidirectionally aligned in the vehicle transverse direction y. This ensures that cross member 2, as viewed in the vehicle transverse direction y, has a high tensile strength. Inner material layer 25, together with outer material layer 29, forms a cross member base part 33 which, in turn, is embedded in an outer cover layer 34, as will be described below. Cross member base part 33 is implemented in FIG. 12 or 13 as a solid profile which is rectangular in cross section. However, other arbitrary cross-sectional forms may also be used instead, for example, a c-shaped cross member or a cross member made of a closed hollow profile.

Joint 21 between deformation element 1 and cross member 2 according to one first exemplary embodiment is described with reference to FIGS. 10 and 11. Accordingly, cross member base part 33 depicted with dashed lines only in FIG. 11 is positioned in front of deformation element 1, i.e., cross member base part 33 covers approximately front end face 35 of cross member base part 33. According to FIG. 11, fiber fabric 14 of deformation element 1 is extended with a total of four fabric strips 37 through 41 forward beyond end face 35 in the vehicle longitudinal direction x. The fabric strips 37 through 41 described below are embedded as integral components of cross member 2 in the plastic material thereof, the outer cover layer 34 of cross member 2 in particular being laminated over fabric strips 37 through 41, as indicated in FIGS. 12 and 13.

As is apparent from FIG. 11, of the four fabric strips 37 through 41, one upper, horizontal fabric strip 37 and one lower, horizontal fabric strip 38 are provided, which surround cross member base part 33, forming a closed loop 43 in the process, which loops around cross member base part 33. Fabric loop 43 defines a retaining pocket, into which the end of cross member base part 33 is inserted.

In addition, fiber fabric 14 of deformation element 1 is extended with two lateral, vertical fabric strips 39, 40. Lateral outer, vertical fabric strip 39 in FIG. 11 is angled at a folding edge 45 in vehicle transverse direction y and overlaps in the process fabric loop 43. Inner, vertical fabric strip 40 in vehicle transverse direction y is also angled inwardly at a folding edge 45 and, together with fabric strip 39, extends in transverse direction y as far as the opposite deformation element. Joint 21 provided on the opposite side is identical to joint 21 shown in FIG. 11. The two vertically oriented fabric strips 39, 40 together form cross strips, which connect fiber fabrics 14 of the two deformation elements materially uniformly and in one piece.

Figure 14:
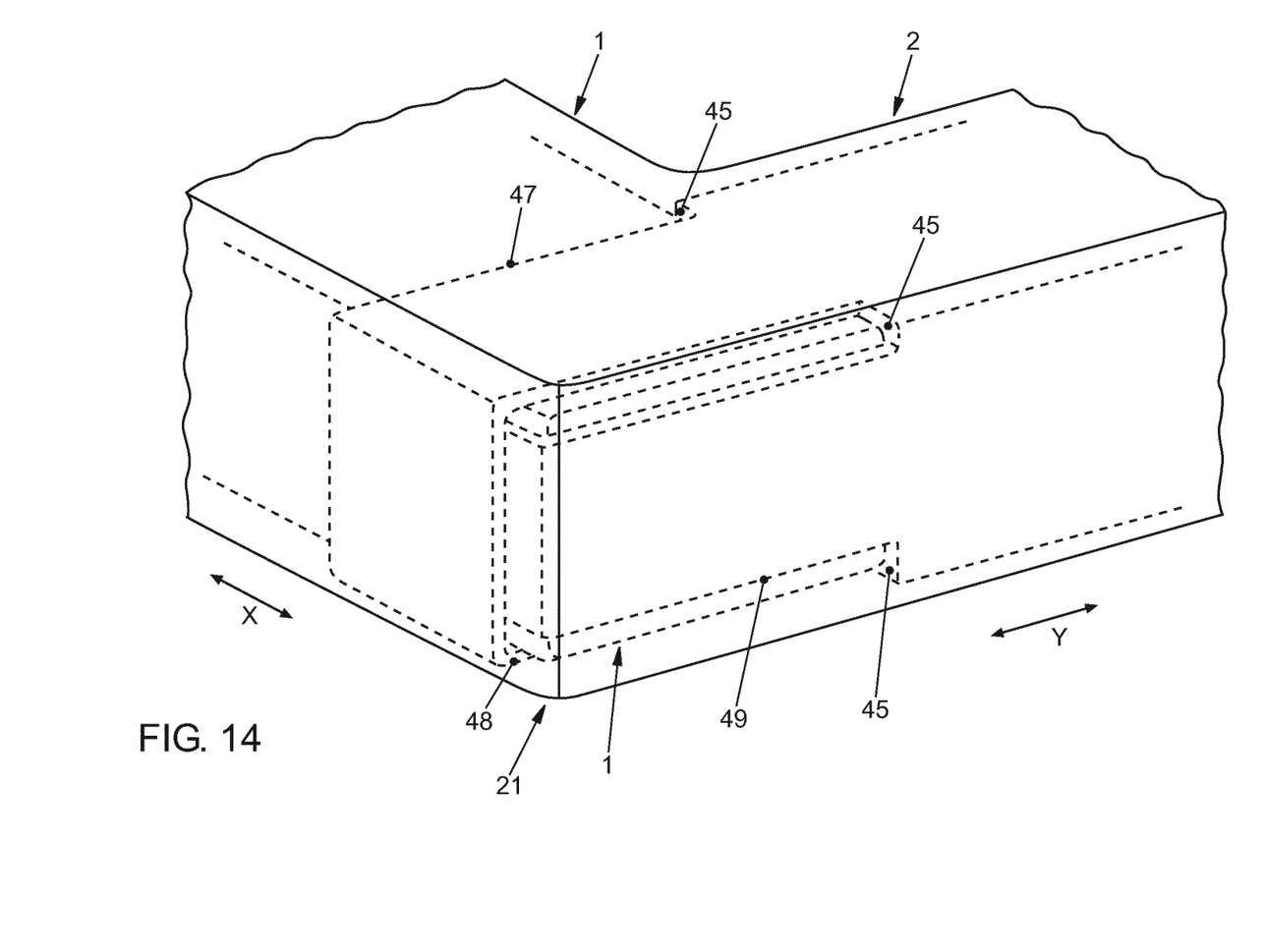
FIGS. 14 and 15 show different views of a joint between the deformation element and the cross member according to one second exemplary embodiment.
Figure 15:
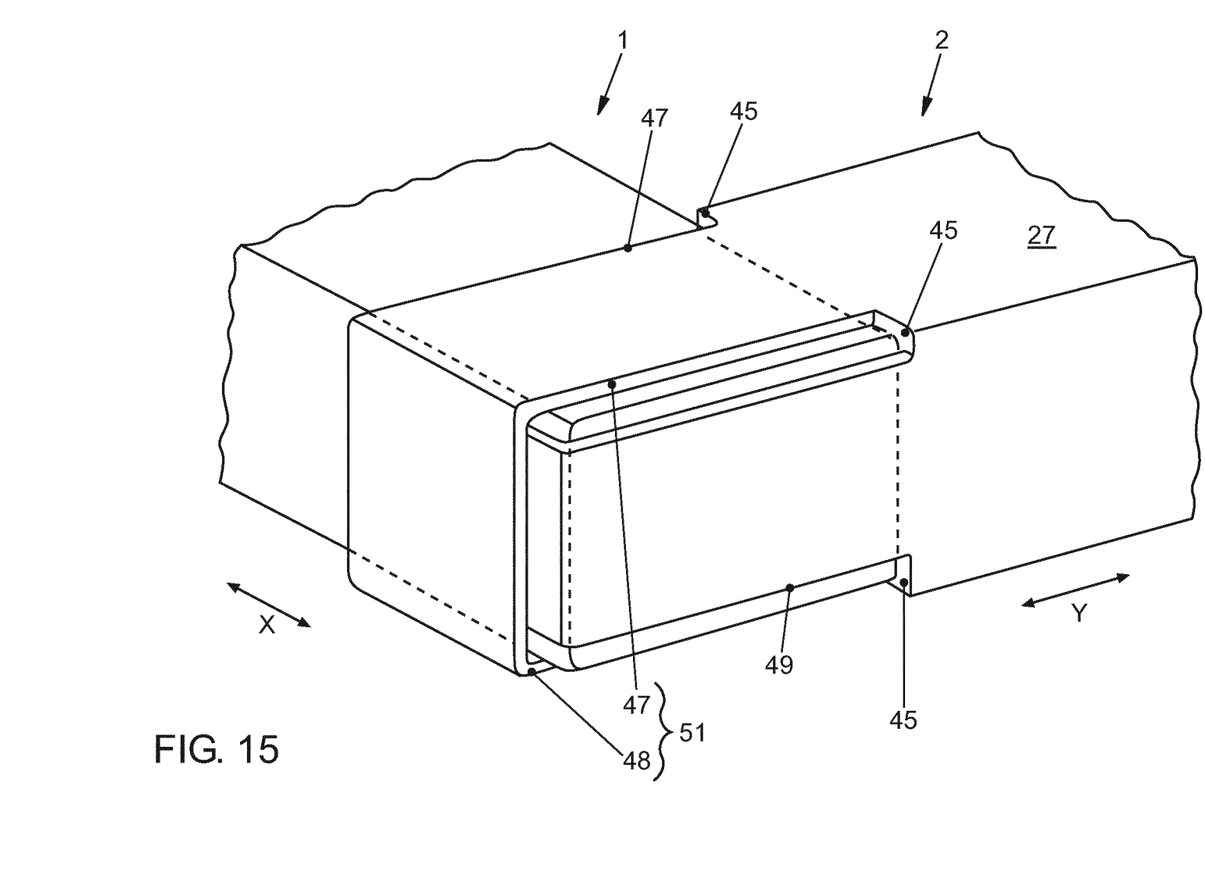

Joint 21 between deformation element 1 and cross member 2 according to one second exemplary embodiment is shown in FIGS. 14 and 15. Accordingly, deformation element 1 is positioned outwardly in front of cross member 2 (or its cross member base part 33) in vehicle transverse direction y. This means that deformation element 1 covers end face 45 of cross member 2. According to FIG. 15, fiber fabric 27 of inner material layer 25 of cross member 2 is extended with upper and lower horizontal fabric strips 47, 48, as well as with a front vertical fabric strip 49.

Fabric strips 47, 48 and 49 described below are embedded as integral components of deformation element 1 in the plastic material of the latter, outer cover layer 34 being laminated over fabric strips 47, 48 and 49.

As is apparent from FIG. 14, of the three fabric strips 47, 48 and 49, one upper, horizontal fabric strip 47 and one lower, horizontal fabric strip 48 are provided, which surround deformation element 1, forming a closed loop 51 in the process, which loops around deformation element 1. Fabric loop 51 defines a retainer pocket in which the end of deformation element 1 is inserted. In addition, fiber fabric 27 (FIG. 15) of cross member 2 is extended with a front, vertical fabric strip 49.

What is claimed is:

1. A deformation element for a bumper cross member of a motor vehicle, comprising:
   at least one inner material layer made of a fiber-reinforced plastic having a fiber fabric embedded in a bedding material, wherein the at least one material layer comprises at least two outer material layers arranged on both sides of the at least one inner material layer, thereby forming a three layer structure, wherein the at least two outer material layers and the at least one inner material layer are made of said fiber-reinforced plastic,
   at least one predetermined breaking point, at which in the event of a crash the deformation element breaks apart into at least one displaceable breaking segment facing the crash that is displaced over the course of the crash, and one fixed breaking segment facing away from the crash, wherein, at the at least one predetermined breaking point, a section of the fiber fabric is exposed between respective breaking segments after the deformation element breaks apart and connects the breaking segments to each other.

2. The deformation element as recited in claim 1, wherein, after the deformation element breaks apart, the at least one displaceable breaking segment facing the crash is configured to displace past the fixed breaking segment facing away from the crash, and wherein the exposed fiber fabric section is configured to tear out additional breaking material from the bedding material, thereby reducing deformation energy.

3. The deformation element as recited in claim 1, wherein the section of the fiber fabric exposed between the breaking segment is tensioned over the course of the crash, and/or the fibers of the fiber fabric are aligned in the direction of tension, thereby increasing the tensile of the fiber fabric.

4. The deformation element as recited in claim 1, wherein the section of the fiber fabric exposed between the breaking segments is adapted to be limp relative to a fiber-plastic-composite of the deformation element, and wherein the bedding material is adapted to be brittle relative to the fiber fabric.

5. The deformation element as recited in claim 1, wherein the fiber fabric of the at least one inner material layer has high fiber strength relative to the fiber strength of the at least two outer material layers.

6. The deformation element as recited in claim 1, wherein fibers fabric of the at least one inner material layer are arranged in a direction in alignment with a longitudinal axis of the deformation element, and wherein fibers of the at least two outer material layers are arranged in a direction perpendicular to, or at an angle relative to, a direction of the fibers of the at least one inner material layer.

7. The deformation element as recited in claim 1, wherein the fibers of the at least one inner material layer are formed of carbon fibers, Kevlar fibers, aramid fibers, or boron fibers, and wherein the fibers of the at least two outer material layers are formed of /or the fibers of glass fibers.

8. The deformation element as recited in claim 1, wherein the bedding material is an epoxy resin, a polyester resin and/or a vinyl ester resin.

9. The deformation element as recited in claim 1, wherein the deformation element is a tube or has a polygonal profile, and/or wherein the predetermined breaking point is an abrupt change in diameter at which the breaking segments merge in such a way that the breaking segments are pushed one on top of the other during a crash-related force transmission.

\* \* \* \* \*